United States Patent [19]

Magiske

[11] Patent Number: 4,490,012
[45] Date of Patent: Dec. 25, 1984

[54] SAFETY REAR VIEW MIRROR DEVICE

[76] Inventor: David M. Magiske, R.D.#3 - Box 312, Monongahela, Pa. 15062

[21] Appl. No.: 484,879

[22] Filed: Apr. 14, 1983

[51] Int. Cl.[3] .............................................. G02B 7/18
[52] U.S. Cl. .................... 350/637; 248/466; 248/900
[58] Field of Search ............ 350/298, 98, 307; 351/50, 158; 248/475 R, 476, 466, 900

[56] References Cited

U.S. PATENT DOCUMENTS

| 1,504,344 | 8/1924 | Hennigh | 351/50 |
| 1,892,365 | 12/1932 | Rowan | 351/50 |
| 3,988,058 | 10/1976 | Chaney et al. | 350/298 |
| 4,105,183 | 8/1978 | Clark | 350/298 |
| 4,349,246 | 9/1982 | Binner | 350/298 |

Primary Examiner—Jon W. Henry
Attorney, Agent, or Firm—Parmelee, Miller, Welsh & Kratz

[57] ABSTRACT

A safety rear view mirror device has a detachable mounting base part for removably securing it alternately on the brim or peak portion of a cap or the crown portion of a hat or other type of head covering. The mounting base part is bifurcated to alternately fit over and to be securely clamped by a mounting screw to the peak portion of a cap or alternatively, to rest against and to be clamped on the crown portion of a hat by a through-extending mounting screw. A flexible and ductile connector cable is endwise slidably removably mounted at one end within a collar portion of the base part and, at its other end, is adapted to be securely and detachably mounting by a spring clip to a back mounting for a back-viewing mirror. The cable is constructed for easy finger-grip bending to move the mirror into the best rear viewing position, with full assurance that the cable will stay in its selected bent positioning. The cable has a metal core cast within and enclosed by a hollow insulating sheath.

13 Claims, 6 Drawing Figures

U.S. Patent  Dec. 25, 1984  4,490,012
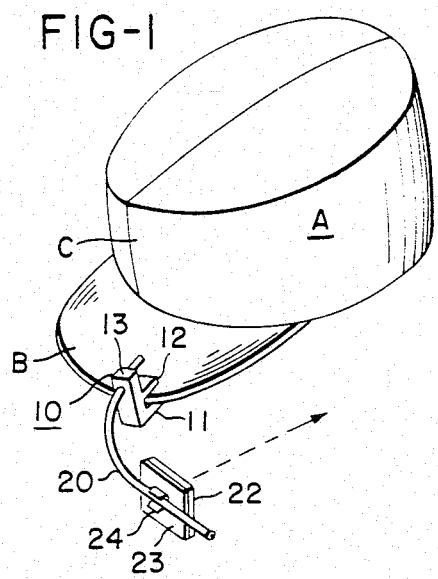
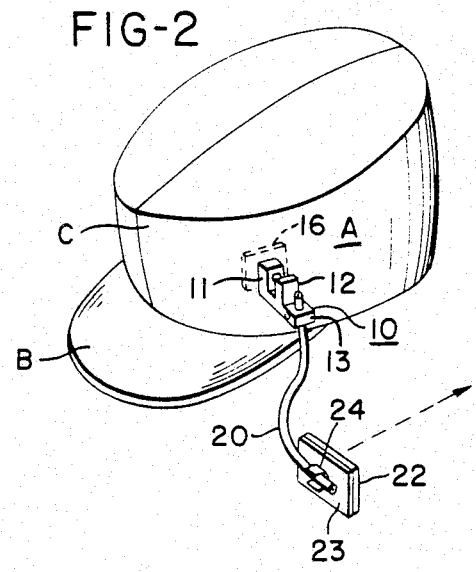
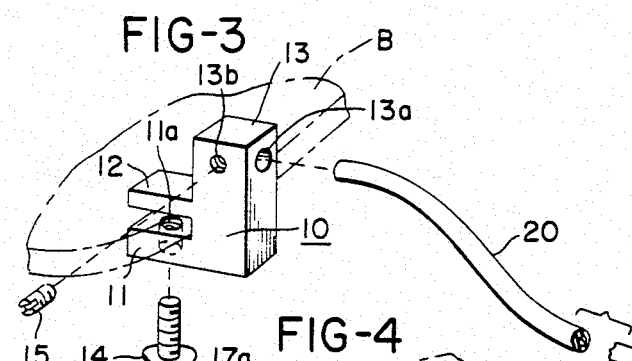
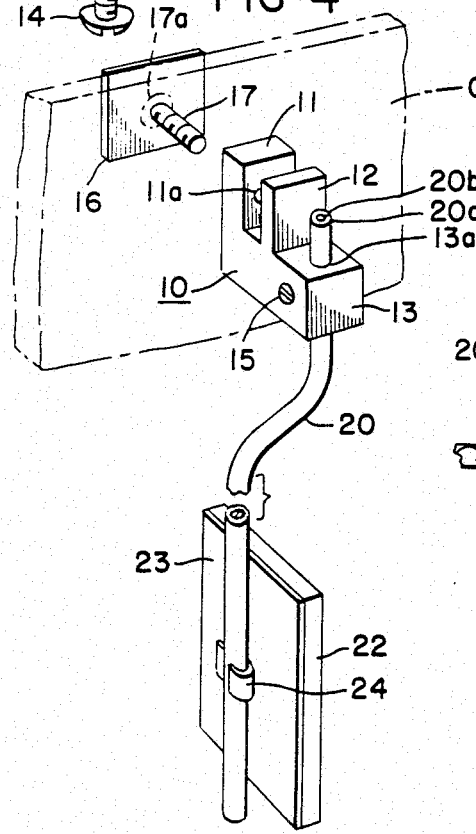
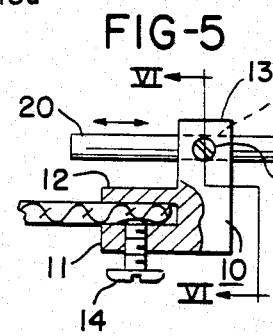
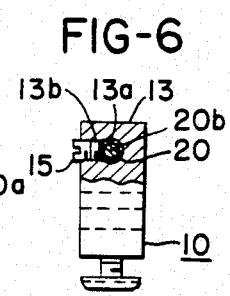

SAFETY REAR VIEW MIRROR DEVICE

BACKGROUND OF THE INVENTION

There has been a need for an inexpensive but fully practical device that may be worn by a plant or building guard or by a sportsman such as a hunter, a bicycle rider or a jogger to enable him to see behind him, not only for safety or protection purposes but also for a full concept of his surroundings.

Rear view mirrors have been used for trucks and automobiles and mirrors have been made adjustable, such as represented by U.S. Pat. Nos. 2,910,915 and 2,968,995, British Pat. No. 405,521 and French Pat. No. 657,303. U.S. Pat. No. 2,917,970 is of interest from the standpoint of a clip-on mirror device for attachment to the eyeglasses of a wearer. However, the only device to my knowledge at the present time that has been designed for attachment to a cap, hat or helmet is represented by U.S. Pat. No. 3,988,058. This device has been found to be relatively unstable in its operative usage. Further, it is only adapted for attachment either to the frame of a pair of eyeglasses or to the brim of a cap. In order to get a rear view perspective, it requires two so-called ball and socket joints which not only make it expensive, but have resulted in difficulty in attaining and of retention of a desired adjustment.

There is thus a need for a simple and inexpensive but practical safety or sports device which may be detachably secured to any part of a head covering, such as a cap or hat and principally, to the crown of a hat, for example, or to the brim or peak of a cap. In endeavoring to provide a suitable device for this purpose, I have eliminated the need for and the cost and other disadvantageous features inherent in the use of a pair of ball and socket joints. In this connection, I have provided a construction in which the connecting part between the mounting part and the mirror is easily and fully adjustable from the standpoint of its effective length and of a special construction such that it, in itself, may be employed to easily and quickly adjust the back viewing relation of the mirror part and enable a semi-rigid retention of a desired mirroradjusted position. The tendency of ball and socket joints to become loose and provide poor back position retention is eliminated. The connecting part of my device is able to withstand repeated deformations or adjustments as to its shape without failure and while retaining a suitable adjusted positioning.

It has thus been an object of the present invention to devise a new and improved hat or cap mounting rear view mirror device suitable for full back-viewing that will be inexpensive to produce, of simple construction, and fully practical in its operation.

Another object of the invention has been to devise a hat or cap type of rear view mirror device which will be adjustable from the standpoint of the supported length of a mirror carried thereby, and also that will be adjustable from the standpoint of any suitable back-view positioning of the mirror.

A further object of the invention has been to devise a connecting cable between the mounting and mirror parts of a back view mirror device that can be produced inexpensively and that will withstand repeated back viewing adjustments.

A still further object of the invention has been to provide a base mounting part that will enable the device to be securely and removably mounted on either a brim or a crown portion of a head covering.

These and other objects of the invention will appear to those skilled in the art from the hereinafter described and illustrated embodiment.

THE DRAWINGS

FIG. 1 is a perspective view in elevation showing a mirror device of the invention detachably mounted on the peak or brim of a cap;

FIG. 2 is a perspective view on the same scale as and similar to FIG. 1 but showing the device detachably mounted on a crown of the cap;

FIG. 3 is an enlarged exploded horizontal perspective view showing details of the construction of the device;

FIG. 4 is an enlarged vertical perspective view on the scale of FIG. 3 showing details of a slight modification of the device which may be employed when mounting it on the crown of a cap or hat in the manner shown in FIG. 2;

FIG. 5 is a partially sectioned, enlarged, fragmental view showing details of a bifurcated base mounting part of the device as used in the manner shown in FIG. 1;

And FIG. 6 is an end section of the base mounting part taken along the line IV—IV of FIG. 5.

THE ILLUSTRATED EMBODIMENTS

As shown particularly in FIGS. 1, 2 and 3, a cap A having a peak or brim portion B and a crown portion C is representative of a head covering to which a safety back or rear viewing mirror device of the invention may be applied, either horizontally or vertically. FIG. 1 shows a horizontal type of mounting, such as may be employed with a brim or peak B of a hat or cap, while FIG. 2 shows a vertical type of mounting which employs a slightly modified form of the device illustrated particularly in FIG. 4 for attachment to the crown portion C of the head covering.

The sports mirror device has a detachable mounting base part 10, an adjustably easily hand-bendable, position-retaining, connecting cable 20, and a mirror 22 having a back mount 23 secured thereto. The mounting base part 10, as shown particularly in FIG. 3, has an end-positioned, bifurcated leg portion 11 in a suitable spaced relation with an intermediate-positioned, bifurcated leg portion 12. The bifurcated portions 11 and 12 are carried by a supporting base portion 13 which is adapted to detachably and lengthwise adjustably receive one end of the cable 10.

For mounting the base part 10 on the brim portion B or the crown portion C of a head covering, its bifurcated portion 11 is provided with a threaded screw-receiving bore 11a (see FIG. 30. In the embodiment of FIG. 1, a mounting screw 14 is adapted to extend into the bore 11a to, as shown in FIG. 5, tightly clamp the base part 10 to the peak B of the cap. A through-extending, smooth bore 13a in the supporting base portion 13 enables a lengthwise adjustment of and provides a collar-like mount for one end portion of the cable 20. A set screw 15 is adapted to extend through a threaded, cross-extending hole 13b to secure the cable 10 in a desired lengthwise-extending relation from the standpoint of the bore 13a.

The mirror 22 is of a suitable size and preferably has a rectangular contour, with its greater length extending horizontally. It is securely mounted on a back mounting 23 of a suitable material, such as of lightweight metal or plastic, see particularly FIG. 3. A mounting bracket 24, preferably of spring metal construction is shown secured centrally to the back mounting 23 to detachably receive the other end of the cable 20 therein and, if desired, to further adjust the effective lengthwise extent of its reach between the base mount 10 and the mirror 22.

In the embodiment of FIGS. 2 and 4, the same main parts 10, 20 and 22 are used, but a somewhat rigid, fabric-like or resin washer 16, shown of square shape for a better hand grip is employed as a back or inside-positioned mount for an embedded head portion 17a of a mounting screw 17. As illustrated, the screw 17 is adapted to extend through a hole in the crown portion C of the head covering A; and the washer 16 may be turned by hand to screw it into a tightly secured position within the threaded bore 11a of the mounting base part 10. In this type of positioning, however, the mounting base part 10 extending horizontally rather than vertically as shown in FIG. 1, and the connector cable 20, in effect, initially extends vertically instead of horizontally from the mounting base.

In both types of construction, the most efficient viewing position for the mirror 22 can be obtained by adjusting the effective length of the connector cable 20 to a best viewing length between the mirror 20 and the base mount 10. Then, the connector cable 10 can be hand bent by the wearer to any suitable shape for a final back viewing adjustment.

By utilization of the cable 20 of a special design or construction, I have been able to eliminate the need for at least a pair of universal joints or pivots and to rely on simple and fully positive means for accomplishing a much better type of adjustment. Also, the adjustment is not limited from the standpoint of the outward extent of the mirror 22 with respect to the head covering A.

The design or construction of the connector cable 20 is important to the invention, in that it should be of a type that will permit it to be easily hand-deformed or bent to any suitable shape, and to stay in such shape, without any tendency to automatically return to its initial shape from the standpoint that it will lack a memory characteristic. It also should have ductility, be non-brittle, and have sufficient tensile strength. Although an ordinary insulated copper wire of a relatively smaller gage, e.g. 16 gage, has been tried for use, I have found that metal wire, itself, is too stiff and tends to fatigue and the hand grip diameter is not satisfactory. For these reasons, as an optimum, I have devised a cable 20 which has an outer sheath or hollow insulative type of covering 20a of resin or fabric-like material 20a and a metal core 20b of about 7.5 gage of a suitable soft metal, such as solder. In this connection, best results are obtained by closing-off one end of the sheath 10a and pouring molten solder into the other end, permitting it to soldify therein to form a composite product. The core 20b should be ductile and have a good tensile strength, e.g. about 7,000 lbs./sq. inch, but must be without memory.

A suitable lead-tin metallic alloy solder has a melting temperature of about 170° C. and has about two to three parts of lead with about four to five parts of tin. The above type of forming of the connector cable 20 avoids oxidation of the molten metal when it sets; thus brittleness and lack of a suitable strength are avoided. The construction of the cable 20 is preferably such that its outer diameter is about one quarter of an inch to provide a good hand grip; it may be easily bent with the fingers of one hand, but will positively retain an adjusted positioning or shape and will retain its ductility without breaking on many bendings.

Although for the purpose of illustration I have shown my device attached alternatively to the brim or crown portion of a cap, it will be apparent that it may also be mounted on any suitable head covering such as a hat or helmet. It is believed that a primary function attained by the device has been to enable the user to scan without head movement significant portions of the landscape to the rear. This is particularly important when hunting, for example, turkey or deer. A normal person sees with direct and peripheral vision, with peripheral vision covering about twice the area of direct vision. By using two devices, one mounted on each side of the head covering, I have been able to double the vision scope or area without turning the head.

The length adjustment of the mirror sight as enabled by my device is also important in avoiding back viewing obstructions, including the wearer's head and head covering. Also of importance is the ability to substitute any suitable or more desirable shape, weight, or size of mirror as needed for a particular utilization. Generally speaking, I prefer a mirror of rectangular shape since it does not adversely effect peripheral and forward vision.

We claim:

1. A safety rear view mirror device to be detachably secured to either a substantially vertical crown portion or a substantially horizontal brim portion of a head covering, which comprises, a detachable mounting base part having a leg portion for removably securing said base part on the head covering, a lengthwise-extending adjustably hand-bendable position-retaining connector cable, a mirror having a back mounting therefor, means lengthwise adjustably securing said connector cable between said mounting base part and said back mounting; said connector cable having a hollow sheath enclosing a ductile core extending therealong, and said cable being characterized by its ability to be repeatedly bent into a desired shape without breakage and to retain such shape without memory for supporting said mirror thereon in a desired back-viewing aligned position.

2. A safety rear view mirror device as defined in claim 1 wherein said lengthwise adjustably securing means comprises: a collar portion carried by said mounting base part to receive one end of said connector cable in a slidable lengthwise adjustable relation therein, and means cooperating with said mounting base part for securing said connector cable in a lengthwise adjusted position within said collar portion.

3. A safety rear view mirror device as defined in claim 2 wherein a spring bracket is secured to said back mounting for detachably receiving the other end of said connector cable.

4. A saftey rear view mirror as defined in claim 1 wherein, said mounting base part has a pair of spaced-apart leg portions defining a bifurcated side of said mounting base part, said pair of leg portions are adapted to fit over and receive the brim portion of the head covering, an end leg portion of said pair of leg portions for fitting against the crown portion of the head covering and having a threaded bore therethrough, and screw means cooperating with said threaded bore to either extend through a hole in the brim portion or the crown portion and into said threaded bore to secure said end leg portion in a mounted position on the head covering.

5. A rear view mirror device for secure attachment to either a substantially vertical crown portion or a substantially horizontal brim portion of a head covering which comprises, a mounting base part having means for detachably removably securing said mounting base part on the head covering, a lengthwise extending position-retaining flexibly adjustably bendable connecor cable, a mirror having a back mounting, collar means on said base part to securely receive and carry one end of said connector cable, means secured on said back mounting to receive the other end portion of said connector cable and support said mirror, said connector cable having a relatively ductile metal core characterized by its lack of memory, said core being positioned within and along a hollow enclosing sheath, said connector cable being adapted to be bent without failure into and retained in a desired shape for adjusting said mirror into and retaining it in a fully supported back viewing aligned position, and at least one of said means longitudinally adjustably securing said cable in position between said mirror and said base part.

6. A safety rear view mirror device as defined in claim 5 wherein, said collar means has a through-extending bore to lengthwise-slidably receive the one end of said connector cable, and means cooperating with and carried by said mounting base part to detachably secure the one end of said connector cable in an adjusted position in said collar means.

7. A safety rear view mirror device as defined in claim 5 wherein, said connector cable has a ductile lead core cast and encased within a protective insulating sheath, and said lead core has a secure fit within and along said sheath such that bending of the connector cable into various positions may be minutely effected without weakening said connector from the standpoint of its supporting function.

8. A safety rear view mirror device as defined in claim 5 wherein, said connector cable has a ductile core of solder metal cast and encased within a protective insulating sheath, and said sheath is in the form of a casing that is filled with solder.

9. A saftey rear view mirror device as defined in claim 8 wherein, said core has a diameter of about 7.5 gage and the overall diameter of said connecter cable is about ¼ of an inch.

10. A mirror device as defined in claim 5 wherein, said collar means is adapted to adjustably slide along said connector cable, and a set screw is carried by said collar means to retain said connector cable at a selected position lengthwise along said collar means.

11. A mirror device as defined in claim 5 wherein said means for securing the other end of said cable to said back mounting is a spring clip carried by said back mounting.

12. A rear view mirror device as defined in claim 5 wherein said base mounting part has a bifurcated part having a pair of bifurcated portions for fitting over the brim portion of the head covering, and securing means extends from one of the bifurcated portions against the brim portion to clamp it against the other bifurcated portion and removably secure said mounting base part on the brim portion.

13. A rear view mirror device as defined in claim 12 wherein, said base mounting part is mounted on the crown portion of the head covering with the one bifurcated portion resting on the outer side thereof, a washer is positioned on the inside of the crown portion in alignment with the one bifurcated portion, and said securing means extends from said washer through the wall of the crown portion into a removably securing relation within the one bifurcated portion.

* * * * *